United States Patent [19]

Murphy et al.

[11] Patent Number: 4,972,006

[45] Date of Patent: Nov. 20, 1990

[54] POSTCURING OF UNSATURATED STEREOLITHOGRAPHIC SPECIMENS USING AQUEOUS INITIATING BATHS

[75] Inventors: Edward J. Murphy, Des Plaines; John J. Krajewski, Wheeling; Robert E. Ansel, Hoffman Estates, all of Ill.

[73] Assignee: DeSoto, Inc., Des Plaines, Ill.

[21] Appl. No.: 241,881

[22] Filed: Sep. 8, 1988

[51] Int. Cl.$^5$ .............................. C08F 4/40; B05D 3/06
[52] U.S. Cl. ...................................... 522/121; 522/85; 522/24; 522/28; 427/54.1; 526/91
[58] Field of Search ................... 522/121, 85, 84, 24, 522/28; 427/54.1, 340, 341, 393.5

[56] References Cited

U.S. PATENT DOCUMENTS 3,083,118  3/1963  Bridgeford ......................... 427/340
4,575,330  3/1986  Hull ..................................... 430/269

Primary Examiner—Marion C. McCamish
Assistant Examiner—Susan Berman
Attorney, Agent, or Firm—Dressler, Goldsmith, Shore, Sutker & Milnamow, Ltd.

[57] ABSTRACT

A method of curing a three-dimensional specimen of preformed cross-linked polymeric material containing polymerizable ethylenically-unsaturated material is provided in which the specimen is immersed in water having dissolved therein an amount of a water-soluble organic free-radical polymerization catalyst effective to transfer a polymerization-initiating amount of the catalyst into the preformed cross-linked polymeric material. This specimen containing the water-soluble organic free-radical polymerization catalyst is heated to a temperature causing polymerization, and is maintained at that temperature while the cure is completed. The aqueous bath preferably contains a catalyst mixture which includes a catalyst of oxidizing character in admixture with a reducing agent, such as an amine, and is maintained at a polymerization temperature of from 60° C. to 100° C. so that immersion of the specimen in a single bath completes the cure.

17 Claims, No Drawings

POSTCURING OF UNSATURATED STEREOLITHOGRAPHIC SPECIMENS USING AQUEOUS INITIATING BATHS

DESCRIPTION

1. Technical Field

This invention relates to the postcuring of unsaturated stereolithographic specimens using aqueous initiating baths.

2. Background Art

It is known, as illustrated in U.S. Pat. No. 4,575,330 to C. W. Hull, to form three-dimensional objects of complex shape by a process known as stereolithography. This process typically uses ultraviolet light to solidify superposed layers of liquid ultraviolet-curable ethylenically unsaturated material at the surface of a reservoir of such material. Thin walled objects (specimens) are usually formed in this manner, apparently thick walls normally being hollow and dimensionally stabilized by thin internal webs. The ultraviolet dosage is limited to insure that only thin layers near those portions of the surface of the unsaturated liquid struck by the beam of ultraviolet light will be solidified. As a result, the stereolithographically formed element which is withdrawn from the liquid bath in which it was formed is a physically weak, cross-linked matrix containing a substantial proportion of unpolymerized monomer imbibed within it.

As will be evident, the thin walled object formed in the liquid reservoir is incompletely cured and has inadequate strength and dimensional integrity. Of particular significance is the fact that these stereolithographic processes are intended to form three dimensional specimens which conform as accurately as possible with what was intended, this usually being set forth in drawings which are cross-sectioned by computer to guide a laser beam in the production of the superposed layers. These incompletely cured products must be further cured to be useful, and it is difficult to complete the cure without damaging the specimen in some fashion, typically by distorting it.

One technique for completing the cure is to expose the incompletely cured specimen to ultraviolet light, but this not only requires that apparatus for this purpose be available, but it is difficult to adequately expose interior portions of the specimen.

Another technique for completing the cure is to place the incompletely cured specimen in an oven, but the high temperature needed for polymerization in the absence of a free-radical generating polymerization catalyst creates difficulties. More particularly, heat is unevenly applied which causes hot spots where the resin composition of the specimen becomes charred. Also, as the incompletely cured specimen is heated in the oven, it softens and loses its shape to some extent. The higher the oven temperature and the slower the heat-induced polymerization, the more difficult these problems.

We have also tried to use organic liquids which can be heated in various ways and cause these liquids to contact the specimen to cure the same. This is superior to the use of an oven since the heat can be more uniformly distributed, but one must still use relatively high temperatures and this technique usually requires a relatively large body of organic liquid which must be replaced when it becomes contaminated.

We have also tried to employ organic liquids to dissolve free-radical polymerization catalysts in the organic liquid, and this reduces the polymerization temperature which is needed. This is helpful, but the organic liquid enters the specimen along with the catalyst which is not desired. Also, the organic liquid used becomes contaminated and must be replaced, and the organic liquids create their own problems, as when they are volatile, combustible or toxic.

One possibility to overcoe the difficulties associated with using organic liquids is the use of water which is inexpensive and innocuous, but water has never been used to modify preformed cross-linked polymeric materials, as are here under consideration.

DISCLOSURE OF INVENTION

This invention is based on our discovery that water having dissolved therein a water-soluble organic free-radical polymerization catalyst can be used to transfer that catalyst into a preformed cross-linked polymeric matrix of a specimen containing within itself polymerizable ethylenically-unsaturated material, especially liquid material like monoethylenic monomers and polyethylenic low molecular weight oligomeric compounds. The preformed cross-linked polymeric material containing ethylenically-unsaturated material and imbibed water-soluble organic free-radical polymerization catalyst can then respond to a lower polymerization temperature, especially in the presence of a water-soluble organic reducing agent, and the response is more rapid to thus minimize any charring or distortion of the specimen.

The catalyst can be a single polymerization-initiating agent, such as an azonitrile compound illustrated later, or a mixture of several components, such as two components which interact to provide the polymerization-initiating agent. These two component systems are themselves well known and identified as oxidation-reduction systems. In these two-component systems a catalyst of oxidizing character, such as a peroxide or hydroperoxide, is used in combination with a water-soluble organic reducing agent, typically an amine. When a mixed system is utilized, both components must be present, and these can be provided in one or more baths. When a single agent is used as the catalyst, only one bath is needed, albeit other baths containing no active agent can be present.

The amount of catalyst can vary widely. It is only necessary that the water have dissolved therein an amount which is effective to transfer a polymerization-initiating amount of the catalyst into the preformed cross-linked polymeric material. This happens progressively and polymerization can proceed as the catalyst is imbibed into the solid specimen or thereafter. Typically one can employ from 0.1% to 10%, based on the weight of the aqueous bath, but from 1% to 5% is preferred.

When the water-soluble organic free-radical polymerization catalyst is an azonitrile, then reducing agent, such as amines, are not essential. On the other hand, one the water-soluble organic free-radical polymerization catalyst is an organic peroxide or hydroperoxide (like cumene hydroperoxide), then a reducing agent, such as an amine, is essential to provide any significant cure.

Accordingly, and in this invention, a stereolithographic specimen produced in conventional fashion and which contains residual polymerizable ethylenic unsaturation is immersed in at least one aqueous bath containing a water-soluble organic free-radical polymerization catalyst to cause that catalyst to be imbibed into the body of the specimen. The term "dissolved" includes stable dispersions for much of the dispersed material is substantially in solution and can be imbibed into the specimen. The specimen with the catalyst within it is subjected to elevated temperature to cause polymerization aided by the presence of the catalyst, and this preferably takes place in the aqueous bath where the specimen is buoyed by the water to minimize distortion.

In preferred practice, the ethylenically unsaturated stereolithographic specimen produced in conventional fashion is cured with a catalyst mixture. More particularly, the specimen is immersed in at least one aqueous bath containing a water-soluble organic free-radical polymerization catalyst of oxidizing character and a reducing agent, typically a water-soluble organic amine. Immersion can be carried out in a single bath or in several baths, but a single bath is preferred.

The aqueous bath is desirably heated, preferably shortly prior to the immersion therein of the ethylenically unsaturated stereolithographic specimen, to a temperature which enhances the penetration of the catalyst into the specimen and which encourages polymerization. At least about 60° C. up to about 100° C. is a preferred temperature, more preferably from 60° to 80° C. for oxidation-reduction catalyst mixtures, and from 80° C. to 100° C. for azonitrile catalysts.

In particularly preferred practice the selected temperature is one at which polymerization in the presence of the catalyst takes place, and this eliminates the utilization of a baking oven since the specimen withdrawn from the aqueous bath can be fully cured. In some instances a further cure in a baking oven can also be used, but this is usually unneeded.

The temperature at which the water-soluble organic free-radical polymerization catalyst of oxidizing character provokes polymerization of unreacted ethylenic unsaturation can be reduced by including in the same or another aqueous bath a water-soluble organic reducing agent, as noted previously. This allows operation with many catalysts at a temperature below about 100° C. Such a temperature is not usually effective to produce polymerization, but it is easily obtained in a water bath in the absence of pressure.

Temperatures above 100° C. are also useful, and are achieved by employing moderate pressure to elevate the boiling point of the water. On the other hand, some catalyst combinations including reducing agent cause polymerization at a temperature below 80° C., especially when one increases the curing time by increasing the dwell time in the water bath.

The dwell time is determined by the extent of cure which is desired. Typically the dwell time will be from 1 minute to 30 minutes, typically about 10 minutes.

Many organic reducing agents which are soluble in water are avaiable and can be used herein, such as butyl mercaptan and butyl thiosulfate, but organic amines are particularly effective because their small size enables them to easily pentrate the unsaturated specimen. Hydroxy-functional amines, such as the ethanolamines, are innocuous and effective, and thus are preferred. These are particularly illustrated by triethanol amine, methyl diethanol amine and diethanol amine.

The use of simple immersion in a heated aqueous system to cure the ethylenically unsaturated stereolithographical specimen has many advantages. The cleanliness and simplicity of the process should be evident. Moreover, monomers clinging to the specimen can be released into the aqueous medium in which they can be tolerated or separated when they are poorly soluble therein.

The water of the bath does not normally enter the specimen and has not been a cause of difficulty. Rather, the water appears to serve as a carrier for the catalyst, forcing it into the cross-linked specimen in which its organic nature forces it to be soluble.

The relatively low curing temperature has many advantages. The reduced temperature minimizes the softening of the specimen before cure to provide greater resistance to having the specimen change its shape under its own weight. The buoyancy of the aqueous medium adds to this advantage. This is especially important for specimens of delicate shape. Further, hot spots and charring are eliminated. The low cost of the aqueous medium is also important, and the use of toxic or odorous chemicals can be minimized or eliminated.

While it is preferred to use water alone, it is permissible to include small proportions of water-miscible organic liquids, like organic solvents which are preferably hydroxy-functional, like 2-ethoxy ethanol or 2-butoxy ethanol, or even ethylene glycol, to enhance the solubility of the catalyst in the water and to enhance wetting of the specimen. Not more than about 10% of such organic liquids is contemplated for this purpose since it is not desired to change the essentially aqueuos character of the baths which are used and which avoid dissolving or substantially swelling the specimen.

The simplest and most preferred operation of this invention involves use of a single bath heated to polymerizationl temperature, for then all that is needed is to immerse the specimen in one bath until it is cured. It is obviously easiest to provide and employ only a single bath. One simply heats the water and adds the water-soluble catalyst (which may include the water-soluble reducing agent) at any time. To extend the durability of the bath, it is sometimes convenient to add the catalyst or to heat the catalyst-containing bath just prior to immersion of the specimen.

One can also use separate baths: one aqueuos bath for the water-soluble polymerization catalyst; and another aqueous bath for the reducing agent. These baths can be used in either order. In this way it becomes possible to introduce the amine at one point in time and the catalyst at another point in time and thus avoid having these two materials together in a single bath. This enhances the durability of the baths, but it is still preferred to have all the materials necessary to complete polymerization together in the same bath.

One can also use agitation to encourage removal of monomers clinging to the specimen. Agitation can be enhanced by ultrasonic treatment of the specimen within the bath. When two baths are used the monomers can be removed in the first bath in which the removed monomers will not polymerize. Surfactants can be present in either or both aqueous baths to assist removal of liquid material clinging to the specimen.

The ultraviolet-curable ethylenically unsaturated materials which are used in the preparation of the stereolithographic specimens which are cured in this invention can be broadly constituted by any such material or combination of materials, these being activated to respond to ultraviolet radiation by the inclusion of a photoinitiator which is usually an aromatic ketone.

More particularly, the liquid which is used to constitute the reservoir of liquid in which the ethylenically unsaturated stereolithographic specimen is formed preferably comprises at least one acrylate-functional material since acrylates are the most rapid curing of the ethylenically unsaturated compounds and oligomers which are available. These acrylates can be oligomeric or monomeric, it being usual to employ a mixture of both. It is also preferred to include a mixture of polyethylenic and monoethylenic materials. The oligomeric materials are usually polyethylenic while the monomeric materials can be monoethylenic or polyethylenic. Methacrylates can also be present. Since the compositions under consideration are well represented by known compositions, this aspect of the invention will not be discussed at length, but will be illustrated in the comparative examples presented hereinafter.

Unfortunately, and as previously noted, these known compositions when appropriately exposed to ultraviolet light during the conventional stereolithographic process under consideration (the exposure is rapid and minimal), form gelatinous solids of relatively little strength and dimensional stability, so further cure after removal from the unsaturated liquid bath is essential.

The photoformed objects are thus only partially cured as they are made available in the stereolithographic process and are somewhat gelatinous and mechanically weak due to the low degree of cross-linking and the presence of unconverted monomers and oligomers (which are still unsaturated) within the partially polymerized polymeric structure of the solid object which is formed. The extent of cure can be evaluated by immersing the specimen (after rinsing in tap water and drying for 10 minutes at 160° F.) in methyl ethyl ketone to see what proportion of the weight of the specimen is extracted by the immersion. The extraction is carried out at room temperature for 24 hours.

The invention will be better understood using a few comparisons which will now be discussed. These comparisons were carried out using the following composition for the preparation of a stereolithographic specimen, which is illustrative.

| Component | Parts by Weight |
| --- | --- |
| Epoxy diacrylate (note 1) | 40 |
| Bisphenol A ethoxy diacrylate (note 2) | 40 |
| Tetraethylene glycol dimethacrylate | 10 |
| Propoxylated neopentyl glycol diacrylate (note 3) | 10 |
| Photoinitiator (note 4) | 4 |

(note 1) - The reaction product of two moles of acrylic acid with one mole of a diglycidyl ether of bisphenol A having a number average molecular weight of about 390.
(note 2) - The reaction product of one mole of bisphenol A with 2 moles of ethylene oxide and then with two moles of acrylic acid.
(note 3) - Neopentyl glycol reacted with 2 molar proportions of propylene oxide and then with two molar proportions of acrylic acid.
(note 4) - Darocur 1173, an hydroxy-substituted acetophenone polymerization photoinitiator, available from the E-M Company, Hawthorne, NY.

The evaluation procedure was carried out by photoforming a test specimen and draining off excess liquid in normal fashion. A bath of deionized water was then heated to just below boiling (90°-95° C.) and the photoformed specimen was immersed in the hot water. Any initiators or other materials were then added and the bath was maintained at near boiling for 10 minutes with mild agitation. The specimen was then removed from the bath, rinsed with tap water and dried for 10 minutes at about 70° C. Specimens were then extracted with methyl ethyl ketone, as noted previously, to determine the percentage of material which is extracted and thus to establish the extent of cure provided by the water immersion. All the specimens were made in the same way and had the same size and shape. More particularly, the Hall procedure noted previously is followed to produce specimens having a size of about 2 inches by ½ inch by about ⅛ inch. These are made by having an ultraviolet laser trace out a honeycomb pattern on 12 layers of superposed liquid composition while exposing the liquid to 4–6 Joules/cm$^2$ where the laser beam traces out a pattern. This is insufficient to fully cure the thickness of liquid which is involved.

In practice the aqueous bath is made up and either maintained hot or heated prior to use when the specimen is immersed. But for test purposes the specimen is immersed in the preheated water and any additions are made at that time to minimize variables.

First, the photoformed specimen was extracted without any postcure to determine the extent of cure provided by the stereolithographic process which formed it. In this way 28% of the material in the specimen was removed, so the untreated specimen was extensively uncured. The photoformed specimen was then fully cured with additional ultraviolet light in conventional fashion, and only 0.3% of the material in the specimen was removed. This establishes what a well-cured specimen should be like.

Then, another photoformed specimen was immersed in hot water (maintained at a temperature of 90°-95° C.) without anything being added to the water. Subsequent extraction removed 28.3% of the specimen demonstrating that immersion in hot water does not enhance the cure.

Other photoformed specimens were then immersed in hot water containing 3% hydrogen peroxide (in one instance) and 2% ammonium persulfate (in another instance). These are known inorganic free-radical polymerization catalysts. In the first instance 27.7% was extracted, and in the second instance 27.3% was extracted. These tests demonstrate that water containing conventional inorganic catalysts do not enhance the cure.

Further photoformed specimens were immersed in hot water containing 2% t-butyl hydroperoxide which is a water-soluble known organic free-radical polymerization catalyst. 33.0% was extracted, which demonstrates that water containing only a water-soluble known organic free-radical polymerization catalyst is not helpful. The somewhat greater extraction which resulted is viewed as within experimental error. However, the cure could be enhanced by post baking and the baking temperature needed for this purpose is markedly reduced.

Another photoformed specimen was immersed in water containing the same 2% t-butyl hydroperoxide used above together with 10% of an amine reducing agent (methyl diethanol amine). This amine is an inoccuous water-soluble reducing agent which lowers the polymerization temperature. 0% was extracted, which demonstrates that water containing a water-soluble known organic free-radical polymerization catalyst in combination with a water-soluble reducing agent is effective to fully cure the specimen. Essentially the same result is obtained using two hot aqueous baths, one containing one of the two agents, and the other containing the other agent.

Another photoformed specimen was immersed in hot water containing 2% of hydrogen peroxide together with 10% of the same amine reducing agent (methyl diethanol amine) used above. 28.0% was extracted. This demonstrates that water containing the water-soluble reducing agent together with the wrong type of catalyst (an inorganic catalyst) is not helpful.

Another photoformed specimen was immersed in hot water containing 2% of hydrogen peroxide together with 2% of a nonionic surfactant (Triton X-100). 33.0% was extraced showing that surfactants are not effective to enable the successful use of an inorganic catalyst.

Another photoformed specimen was immersed in hot water containing 2% of hydrogen peroxide together with 20% of isopropanol to see if the presence of a water-miscible organic solvent would allow the inorganic catalyst to replace the organic catalyst. 30.4% extraction established that this is not the case.

Some organic free-radical polymerization catalysts which do not require a reducing agent, such as azo compounds illustrated by azobis isobutyronitrile and the like, can be used herein without a reducing agent. These catalysts which can be used to obtain a reasonable cure during water immersion without reducing agents are more fully illustrated in the material which follows.

Water containing 2% azobis cyano valeric acid as the sole additive reduced the level of extraction to 8.0%. 2% azobis methylbutyronitrile reduced the level of extraction to 2.5%. 2% azobis cyclohexanecarbonitrile reduced the level of extraction to 2.8%. The cure in these instances is benefitted by the use of pressure to raise the water temperature from the temperature range previously noted to a temperature above 100° C., typically 120° C.

Some catalysts, like t-butyl hydroperoxide, can be stored without refrigeration, and this is an advantage. Other catalysts, like methyl ethyl ketone peroxide must be refrigerated for storage. However, these in the presence of amines are effective catalysts at much lower temperatures, and thus can be used in an aqueous bath at a temperature well below 80° C., such as 60°-80° C. The use of lower bath temperature is itself an important advantage.

What is claimed is:

1. A method of curing a three-dimensional specimen of preformed cross-linked polymeric material containing within itself polymerizable ethylenically-unsaturated material therein comprising the steps of immersing said specimen in water having dissolved therein an amount of a water-soluble organic free-radical polymerization catalyst effective to transfer a polymerization-initiating amount of said catalyst into said preformed cross-linked polymeric material, subjecting said specimen containing said water-soluble organic free-radical polymerization catalyst to a temperature sufficient to cause polymerization of the ethylenically unsaturated material, and maintaining said specimen at said polymerization temperature to cure the same.

2. A method as recited in claim 1 in which said specimen is also immersed in water having dissolved therein a reducing agent.

3. A method as recited in claim 1 in which said specimen is immersed in water having a temperature of at least about 60° C. while it is polymerized.

4. A method as recited in claim 1 in which said specimen is made by the photopolymerization of ethylenically unsaturated material a portion of which is polyethylenically unsaturated to provide a gelatinous cross-linked polymeric matrix containing ethylenically unsaturated material.

5. A method as recited in claim 4 in which said cross-linked polymeric matrix contains monoethylenic monomers.

6. A method as recited in claim 1 in which said catalyst is a mixture of a water-soluble organic free-radical polymerization catalyst of oxidizing character and a reducing agent which are present in an aqueous bath heated to a temperature causing polymerization of said ethylenically unsaturated material.

7. A method as recited in claim 6 in which said reducing agent is a water-soluble amine.

8. A method as recited in claim 7 in which said amine is an hydroxy-functional amine.

9. A method as recited in claim 6 in which said catalyst comprises a water-soluble organic free-radical peroxide polymerization catalyst and an amine, said bath being heated to a temperature of at least 60° C.

10. A method as recited in claim 9 in which said aqueous bath is maintained at a temperature in the range of 80° C. to 100° C.

11. A method as recited in claim 1 in which said specimen is immersed in an aqueous bath containing a water-soluble organic free-radical azonitrile polymerization catalyst, said bath being heated to a temperature causing polymerization of said ethylenically unsaturated material.

12. A method as recited in claim 1 in which said bath is maintained at a temperature of from 80° C. to 100° C.

13. A method as recited in claim 2 in which said specimen within said aqueous bath is subjected to ultrasonic agitation to remove liquid materials clinging to said specimen.

14. A method as recited in claim 13 in which said ultrasonic agitation is carried out in an aqueous medium in which polymerization does not occur.

15. A method as recited in claim 1 in which said bath contains surfactants and/or water-miscible organic solvents to aid wetting said specimen.

16. A method of curing a three-dimensional specimen of preformed cross-linked polymeric material containing within itself polymerizable ethylenically-unsaturated material made by the photopolymerization of ethylenically unsaturated material at least a portion of which is polyethylenically unsaturated to provide a gelatinous cross-linked polymeric matrix containing ethylenically unsaturated material, comprising the steps of immersing said specimen in water having dissolved therein a water-soluble organic free-radical polymerization catalyst of oxdizing character and an amine, said water being heated to a temperature of at least 60° C., and holding said specimen in said heated bath to cause polymerization of said ethylenically unsaturated material to thus cure said specimen, and withdrawing the cured specimen from said bath.

17. A method as recited in claim 16 in which said amine is an hydroxy-functional amine and said bath is maintained at a temperature of from 60° C. to 80° C.

* * * * *

UNITED STATES PATENT AND TRADEMARK OFFICE
CERTIFICATE OF CORRECTION

PATENT NO. : 4,972,006

DATED : November 20, 1990

INVENTOR(S) : Edward J. Murphy, John J. Krajewski and Robert E. Ansel

It is certified that error appears in the above-identified patent and that said Letters Patent is hereby corrected as shown below:

Col. 2, line 8: "overcoe" should be --overcome--
Col. 4, lines 30-31: "polymerization1" should be --polymerization--
Col. 8, line 34: "2" should be --1--

Signed and Sealed this

Thirtieth Day of April, 1991

Attest:

HARRY F. MANBECK, JR.

Attesting Officer

Commissioner of Patents and Trademarks